J. HORN.
RAKE.
APPLICATION FILED MAR. 3, 1908.
910,382.
Patented Jan. 19, 1909.
3 SHEETS—SHEET 3.
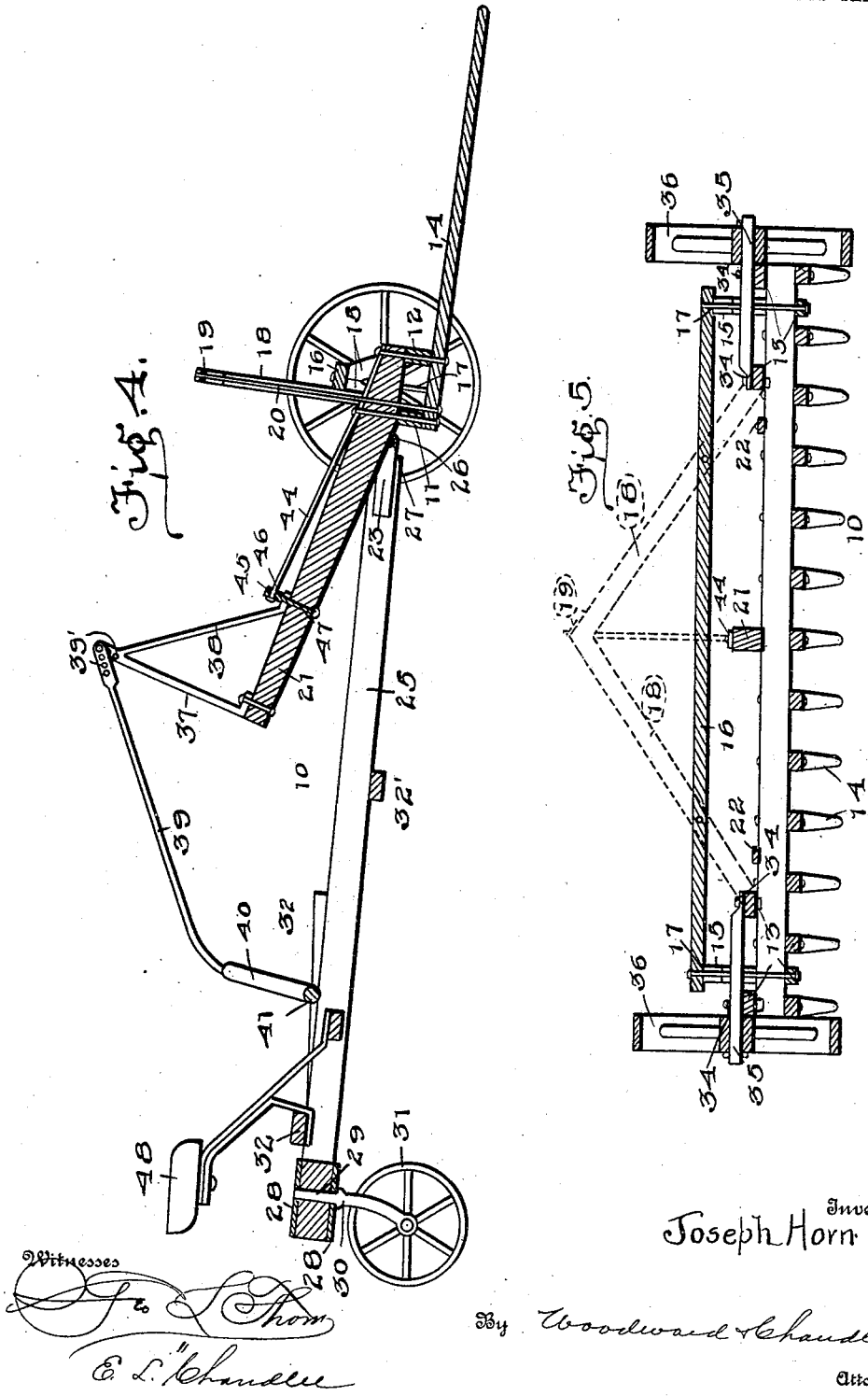
Witnesses
Inventor.
Joseph Horn
By Woodward & Chandler
Attorneys

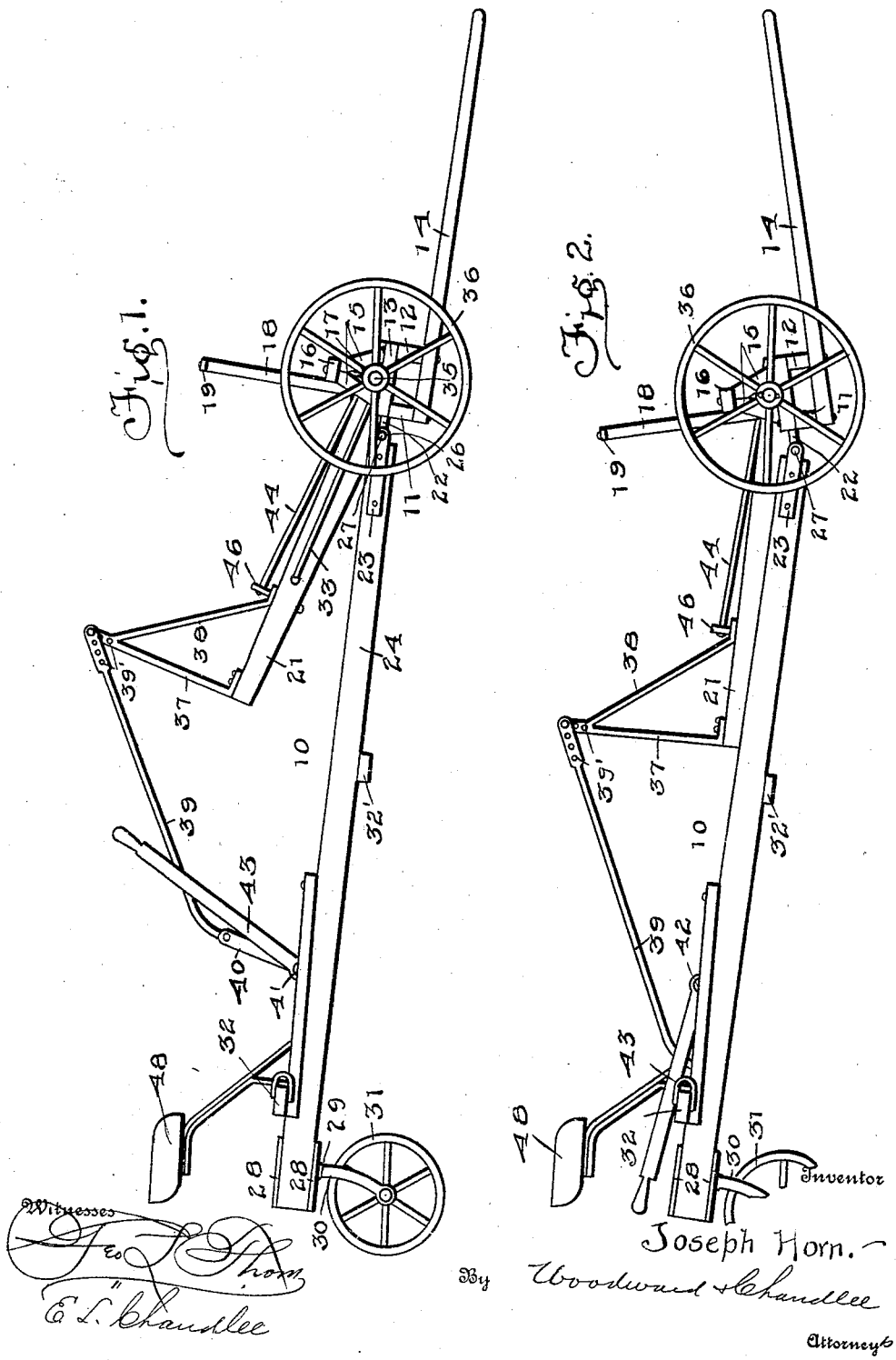

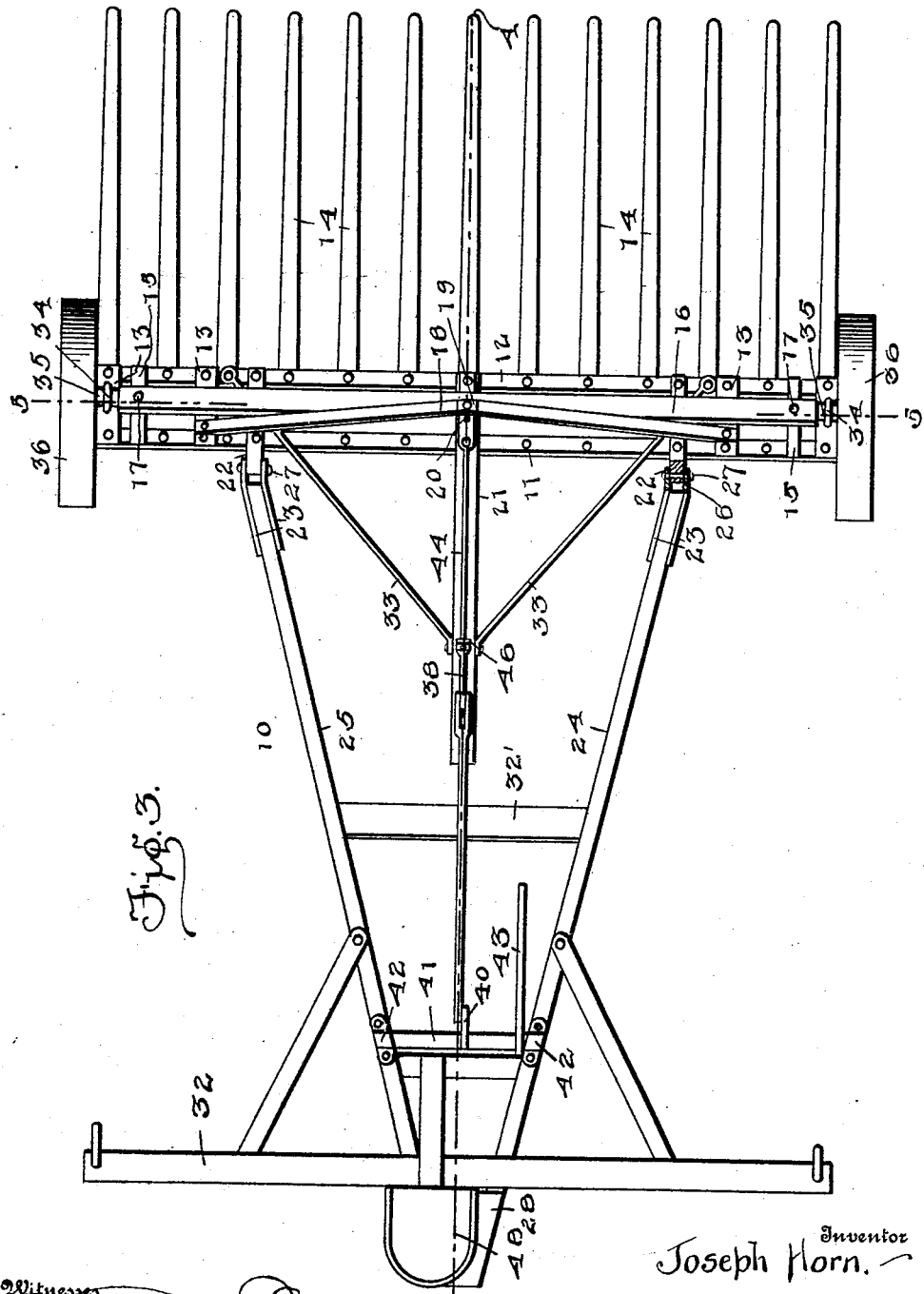

UNITED STATES PATENT OFFICE.

JOSEPH HORN, OF PIMA, ARIZONA TERRITORY, ASSIGNOR OF ONE-HALF TO JOHN LAMBERT, OF PIMA, ARIZONA TERRITORY.

RAKE.

No. 910,382.  Specification of Letters Patent.  Patented Jan. 19, 1909.

Application filed March 3, 1908. Serial No. 418,962.

*To all whom it may concern:*

Be it known that I, JOSEPH HORN, a citizen of the United States, residing at Pima, in the county of Graham and Territory of Arizona, have invented certain new and useful Improvements in Rakes, of which the following is a specification.

This invention relates to agricultural appliances, and more particularly to rakes, and has for its object to provide a device of this character which may be driven through a field with the rake in a position to receive, and after which the rake may be elevated to bring its tines into a position above the ground and thus enable the rake to be easily drawn through the field without injury to its working parts.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side elevational view of the rake showing the same in an operative position, Fig. 2 is a similar view showing the rake in an inoperative position, Fig. 3 is a top plan view of the plate, Fig. 4 is a vertical sectional view on the line 4—4 of Fig. 3, Fig. 5 is a vertical cross sectional view on the line 5—5 of Fig. 3.

Referring now more particularly to the drawings, there is shown a rake 10 which consists of the longitudinally extending parallel beams 11 and 12 respectively which are strengthened by cross beams 13, as shown. A plurality of tines 14 are secured to the under sides of the beams 11 and 12, and these tines project forwardly, as shown. Upwardly convergent bars 15 are secured to the beams 11 and 12, and at each end thereof, and to the upper ends of these bars there is secured a longitudinally extending beam 16. Vertically extending brace rods 17 are secured to the beam 16 and to one of the cross bars 13, and these rods thus serve to brace the beam 16. Upwardly convergent bars 18 are secured to the cross bars 13 which are secured to the beams 11 and 12, and these bars 18 are secured to the beam 16 at points between the ends thereof, and these bars 18 are secured together at their upper ends by a plate 19 through which there is disposed the upper end of a vertically extending rod 20. A rearwardly extending beam 21 is secured at its forward end upon the beams 11 and 12 by bolts 21' passed therethrough for a purpose to be hereinafter described, the rod 20 extending through the beam 21 as shown. The bolts 21' and rod 20 pass through one of the tines 14 as disclosed in Fig. 4.

Transverse bars 22 are secured at their forward ends to the beams 11 and 12, and the rear ends of these bars project outwardly from the beam 11, these ends of the bars being thus arranged to receive against their sides the forward ends of plates 23 which are secured to rearwardly extending and convergent beams 24 and 25. The ends of the bars 22 and the plates 23 are each provided with horizontally extending passages 26, and arranged in these passages there are shown pivot pins 27 and thus the beams 24 and 25 are pivotally connected with the beams 11 and 12. The rear ends of the beams 24 and 25 are provided with plates 28 which are arranged one above, and one beneath the beams, and pivotally arranged in these plates there is shown the upper end of a stem 29. The stem 29 extends downwardly as shown at 30, and pivoted to the stem there is shown a traction wheel 31. The rear ends of the beams 24 and 25 support a doubletree 32, and it will be seen, that the ends of this doubletree project outwardly from these beams, and are thus arranged to receive draft animals at either side of the machine. Cross braces 32' are secured beneath the beams 24 and 25. Brace rods 33 are secured at their rear ends to the beam 21, and at the forward ends, these rods are secured to the forward bar 12. Journal boxes 34 are carried by the bars 11 and 12 and arranged in these boxes, there are shown the ends of axles 35, which carry traction wheels 36.

The rear end of the beam 21 is provided with a vertically extending arm 37, and this arm is connected and braced by a diagonal bar 38 which has its lower end secured to the beam 21. To the upper end of this bar, there is pivotally connected a bar 39, and the opposite end of the bar 39 is pivotally connected to an arm 40 which is carried by a horizontally extending shaft 41. The shaft 41 is journaled in boxes 42 which are secured upon the beams 24 and 25, and upon one end, the shaft 41 is provided with a hand lever 43.

It may be stated that the upper ends of the bar 37 and the forward end of the bar 39 are each provided with a plurality of adjusting openings 39'. A strengthening rod 44 is secured to the forward end of the beam 21, and at the rear, this rod is arranged in a passage 45 formed in a plate 46. The plate 46 carries a stem 47 at its lower end, and this stem is arranged in passages formed in the beam 21 and in the lower end of the diagonal brace bar 38.

The beams 24 and 25 will hereinafter be referred to as a rearwardly extending frame, and the beams 11 and 12, will be referred to as a forward frame.

From the foregoing description it will be seen that a rake comprising front and rear sections is provided, and by their pivotal connection, and by the arrangement of operating levers, it will be seen that the tines 14 of the rake are arranged for engagement with the ground to collect upon a field, and it will further be seen that after the tines have been properly loaded, the rake may be held with its tines away from the ground. A seat 48 is arranged at the rear of the rear frame and directly behind the operating levers.

What is claimed is:

1. In a rake, the combination with a wheeled frame, including spaced longitudinal members, of a forward frame comprising spaced transversely extending members, pivotal connections between the forward frame and the forward ends of the longitudinal members, forwardly extending tines secured to the transverse members of the forward frame, a beam secured upon the transverse members of the forward frame, and extending upwardly and rearwardly between the longitudinal members of the rearward frame, and means connected with the rearward portion of the beam for movement of the beam to shift the forward frame upon its hinges.

2. In a rake, the combination with a rearward frame, of a forward frame hinged thereto, wheels carried by the forward frame, a wheel carried by the forward frame, an upwardly and rearwardly extending beam carried by the forward frame, a shaft journaled upon the rearward frame, an upwardly extending rod carried by the beam, connections between the rod and the shaft for movement of the rearward end of the beam vertically when the shaft is moved, and a hand lever connected with the shaft.

3. In a rake structure, the combination with spaced transversely extending bars, tines secured against the under faces of the bars, a beam secured at its forward end upon the bars and extending upwardly and rearwardly therefrom, an upwardly extending rod carried by the beam, a downwardly and forwardly extending brace rod secured to the first named rod at its upper end and disposed upon the upper face of the beam, a plate having a stem engaged through the lower end of the brace rod and through the beam, said plate having an opening therein, a strengthening rod engaged in the opening of the plate and secured to the forward portion of the beam, and means connected with the upwardly extending rod, for movement of the rearward end of the beam vertically.

4. In a rake structure, the combination with a frame including transversely extending spaced bars, of tines secured against the under faces of the bars, rearwardly extending members pivotally connected with the said frame, a wheel connected with the rearward ends of the rearwardly extending members, an upwardly and rearwardly extending beam secured upon the upper faces of the transverse rods, upwardly extending convergent brace members secured to the bars, and means for shifting the rearward ends of the beams vertically to move the transverse rods upon their pivotal connection with the rearwardly extending members.

In testimony whereof I affix my signature, in presence of two witnesses.

JOSEPH HORN.

Witnesses:
    Jos. H. Lines,
    M. Lines.